Patented Sept. 24, 1929

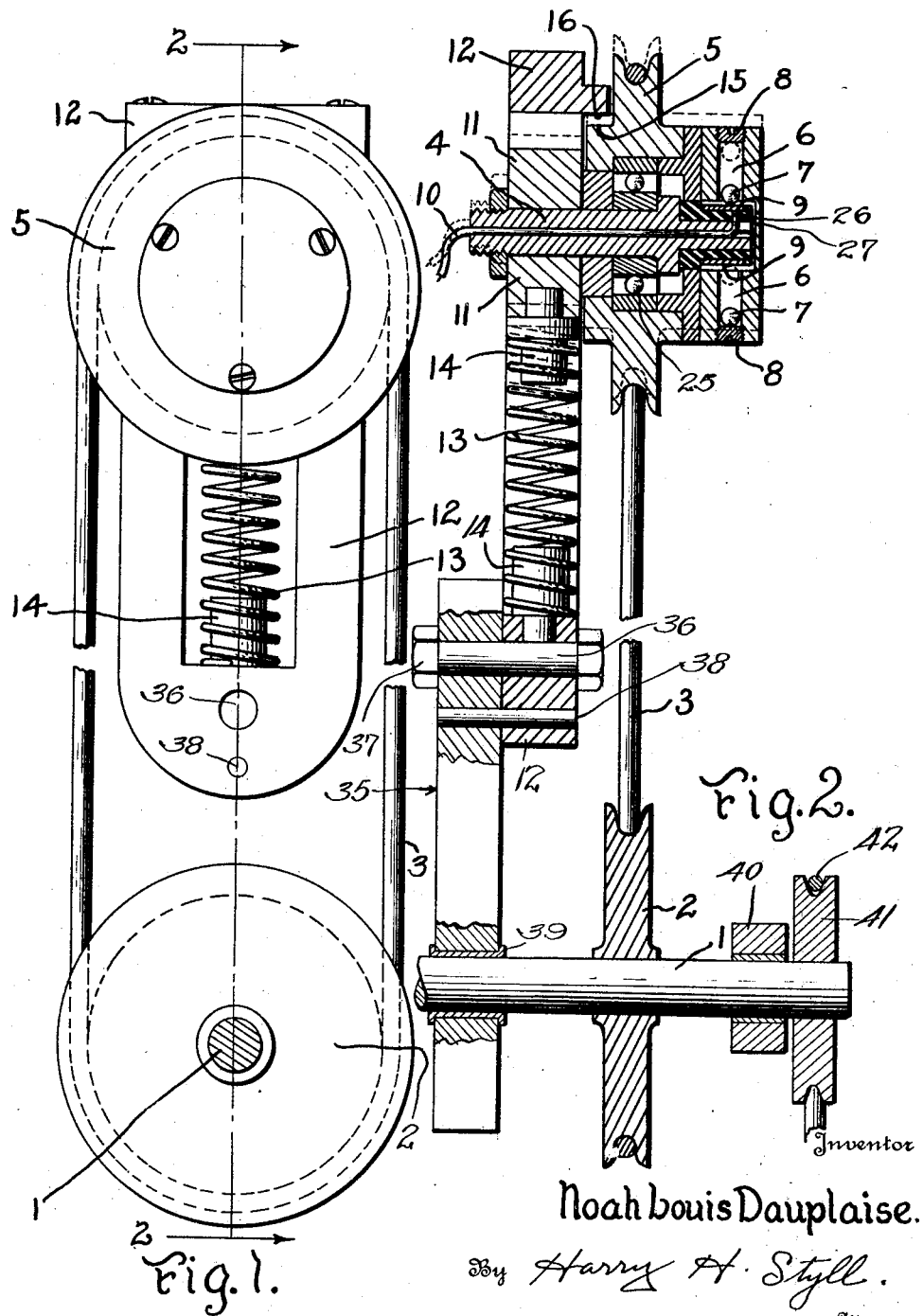

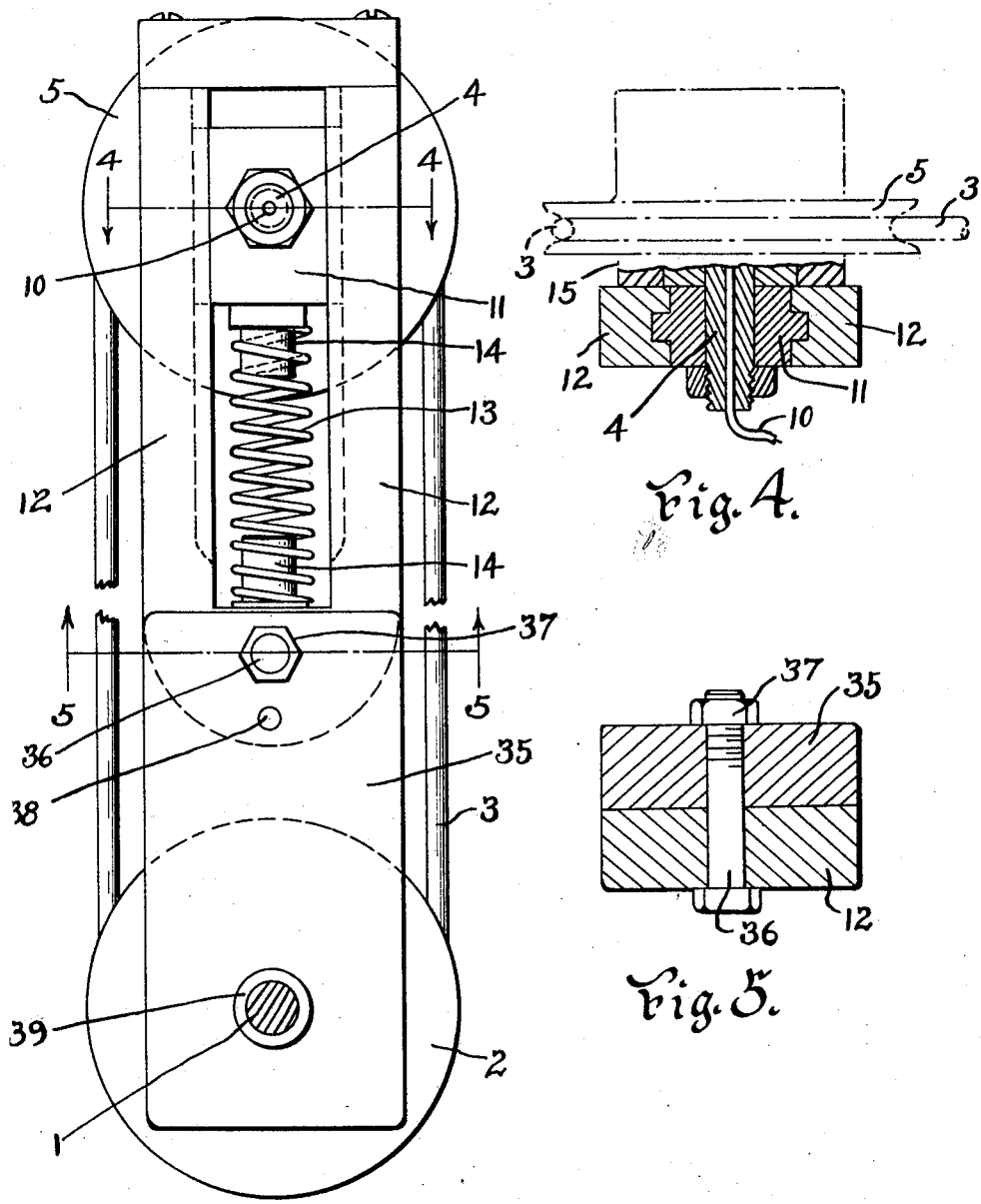

1,729,283

UNITED STATES PATENT OFFICE

NOAH LOUIS DAUPLAISE, OF MANCHESTER, CONNECTICUT

EQUALIZING AND BRAKING DEVICE

Application filed January 22, 1926. Serial No. 83,069.

This invention relates to braking devices and more particularly to a brake for stopping a moving electrical circuit closer and to improved means for providing automatic tension in a wheel and belt power transmission to take up the slack and jump in the transmission belt or belt like drive.

The principal object of the invention is to provide simple, efficient, and inexpensive means for instantly stopping a moving electrical circuit closer when it is necessary to have the circuit closed instantly.

Another object of the invention is to provide improved resilient means that will take up the slack in a belt-like power transmission member to prevent the slap, jump or unequal operation of the same.

Other objects and advantages of the invention will become apparent from the following description and accompanying drawings. I have described and shown only one form of the invention by way of illustration. Other forms and arrangements of parts may be made without departing from the spirit of the invention as expressed in the claims, so I do not wish to be limited only to the form shown and described.

Referring to the drawings in which similar characters denote similar parts throughout:
Figure 1 represents a side view, and
Figure 2 represents a cross sectional view on line 2—2 of Figure 1.
Figure 3 represents a side view showing the side opposite to that shown in Figure 1;
Figure 4 represents a cross section on line 4—4 of Figure 3 looking in the direction of the arrows; and
Figure 5 represents a cross section on line 5—5 of Figure 3.

In many machines and mechanical devices it is of the utmost importance to shut off or stop the power instantly in case of accident to or breakage of certain parts of the mechanism, or the work being performed to prevent the machine or work being destroyed, or in some cases to save life and limb of the operator or other human being and also to provide resilient means for keeping the belt-like power transmission member under tension to prevent slack, jump, slap or unequal operation of the same.

I have illustrated my invention as applied to a revolving or oscillating electric circuit closer which when stopped closes an electric circuit by action of gravity on certain of its parts, and which circuit when closed shuts off the power of the apparatus, as illustrated and described in my Patent No. 1,558,595, issued October 27, 1925.

On a power shaft 1 is a pulley wheel 2 over which travels the belt 3. On a stud shaft 4 is mounted the circuit closer pulley wheel 5 over which also travels the belt 3. Within the wheel 5 are raceways 6 containing the loose metal ball members 7, to which access is had by the cap screws 8. At the bottom of the raceways 6 are the contact plates 9 properly insulated and connected to the current lead 10. The other lead of the circuit is connected to the metal parts of the apparatus so that when the metal ball member 7 drops down into contact with the contact plate 9 the circuit is closed. The mechanism for shutting off the power is connected with the circuit and electro-magnetic means therein so that when the circuit is closed the power is shut off and the mechanism stopped. These parts not being a part of the invention are not shown, but are well known prior art devices. The wheel 5 is mounted on the shaft 4 on ball bearings 25. Through the center of the shaft 4 is laid an insulated electric wire 10 having its end 26 turned over in contact with a brass bushing 9, this brass bushing lying on a fiber insulating bushing 27 on the end of the shaft 4. The insulated wire 10 is connected with a source of electric power, such as electric batteries, not shown, and to a solenoid, not shown, and the solenoid to the machine by a wire, not here shown. The other lead of the circuit is through the machine. Power is turned on or taken off by means of a power handle, not shown. The power handle is operated to off power position by the action of the solenoid. The electric circuit operating the power handle is closed through the action of the balls 7 coming in contact with the brass sleeve 9. When the wheel 5 is oscillated back and forth by the belt 3 the balls 7 are thrown out to the outermost position in the slot 6, and in fact thrown out until they contact with the cap screw 8. This, of course, breaks the electric circuit. Should the belt 3 be broken for any reason, or should the mechanism of the machine jam and slow down the movement of the belt 3 the wheel 5 will pause in its oscillatory action and balls 7 will drop down into contact with the brass bushing 9, thus completing the electric circuit through the machine, which will cause the solenoid to throw the power handle to off power position thus stopping the mechanism. The pulley 5 is rotated or oscillated by the belt 3 which is driven by the power shaft 1. As long as the pulley is rotated or oscillated the balls 7 will be thrown to the outer ends of the raceways 6 and the circuit will be open. The moment the pulley 5 is stopped some of the balls will fall down by gravity in the raceways and strike the contact plate 9 and close the circuit, thus throwing off the power and stopping the machine. If the belt 3 breaks or the shaft 1 is stopped this will happen, but suppose the belt 3 were to break, the momentum acquired by the pulley 5 would cause it to spin or rotate for quite a while, the balls would not drop down and close the circuit, and the power would still be on, and considerable damage could be done before the circuit was closed. To prevent this spinning or rotation of the wheel 5, I have provided the following brake mechanism: The stud shaft 4, on which the pulley 5 is mounted is secured to the slide piece 11, which can slide in the slide way frame 12. Also in the slide way frame 12 is the spring 13 having one end contacting with the frame 12 and the other with the slide piece 11, being kept in place by the studs 14. The spring 13 is compressed by the belt 3. Its position in the frame 12 is determined by the length of the belt 3. On the pulley wheel 5 is a contact shoulder 15, and on the frame 12 is the contact shoulder 16. If the belt 3 were to break, the spring 13 would push the slide piece 11 until the contact shoulder 15 on the wheel 5 would engage the contact shoulder 16 on the frame 12. This would lock the wheel 5 from rotation on the stud shaft 4. The spring would act instantly on the separation of the belt 3, and the circuit would be closed and the machine stopped at once. If the power shaft 1 stopped without the belt 3 breaking or jumping off the pulleys it is clear that the wheel 5 would stop at once and close the circuit. The details of construction and operation of the circuit wheel 5 are fully shown and described in my Patent Number 1,558,595, October 27, 1925.

The slide way frame 12 is secured to the frame 35 of the machine by the bolts 36, nuts 37 and steadying pins 38. The drive shaft is supported by the bearing 39 in the frame 35 and the bearing 40 and is driven by the pulley 41 and belt 42. It is, therefore, clear that the spring 13 will hold the belt 3 taut as the wheel 5 is mounted on the slide 11.

It is also clear that this device may be used in many different kinds of power transmission, as for instance in velvet making mechanism, as shown in my Patent Number 1,558,595, in automobiles and power transmitting machines and apparatus of various kinds.

It has been found from experience, particularly in velvet making mechanism that the pulley being mounted on the resiliently held slide not only provides a simple instantly acting automatic brake to take up the inertia of the rotating circuit breaker but in addition insures the smooth action of the moving mechanism by keeping the belt under tension at all times, preventing slack and slap in the belt and unequal operation of the driving mechanism, thus providing a uniform and high grade product of the machine and also tending to reduce the liability of the belt from jumping off of the pulley. The device hence is not only operative as a stop but is acting in a beneficial way throughout the operation of the machine.

From the foregoing description the construction and operation of the device will be clear, and it will be seen that I have produced a device simple, efficient and inexpensive and well suited to carry out the objects of the invention.

Having described my invention, I claim:

1. In a device of the character described, a rotatable power transmission member, means to rotate the power transmission member, a brake contact member adapted to engage the power transmission member and stop its rotation, and resilient means adapted to force the power transmission member and contact member together when the means for rotating the power transmission member is disengaged therefrom.

2. In a device of the character described, a rotatable power transmission member, a belt like member for moving the power transmission member, a brake member adapted to engage and stop the rotation of the power transmission member and a spring adapted to engage the power transmission member with the brake when the belt like member is disconnected from the rotatable power transmission member.

3. In a device of the character described, a slide member, a movable power transmission member on the slide, a member having a slide way for the slide member, a brake for engaging the movable power transmission member, means for moving the movable power transmission member, and a spring member adapted to move the slide member to engage the movable power transmission member with the brake member when the moving means are disconnected from the movable power transmission member.

4. In a device of the character described, a member having a slide way, a slide movable thereon, a wheel rotatably mounted on the slide, means to rotate the wheel, a brake member adapted to engage the wheel, and a spring adapted to engage the wheel with the brake member when the means for rotating the wheel are disconnected therefrom.

5. In a device of the character described, a member having a slide way, a slide movable thereon, a rotatable wheel on the slide, a belt for turning the wheel, a brake member adapted to engage the wheel, and a spring adapted to engage the wheel with the brake when the belt is disconnected from the wheel.

6. In a device of the character described, a member having a slide way, a slide movable thereon, a wheel rotatably mounted on the slide, a fixed support, a second wheel rotatably mounted on the support, a transmission belt like member operatively engaging the two wheels, and resilient means engaging the slide and tending to urge the slide away from the wheel on the fixed support to hold the belt like means under tension between the two wheels.

7. In a device of the character described, a member having a slide way, a slide movable thereon, power transmission means movably mounted on the slide, a fixed support, power transmission means mounted on the support, power transmission means operatively connecting the power transmission means on the slide and fixed support, and resilient means engaging the slide and tending to urge the slide away from the fixed support to hold the power transmission means connecting the other two power transmission means under tension to prevent slack and play therein.

8. In a device of the character described, a movable power transmission member, a brake member aligned with but spaced from the movable transmission member, means to move the movable power transmission member and hold it out of contact with the brake member, and resilient means adapted to engage the movable transmission member and the brake one with the other when the means to move the movable transmission member is disassociated therewith.

9. In a device of the character described, a rotatable power transmission member relatively fixed in position, a rotatable power transmission member slidably movable with respect to the fixed power transmission member, means for transmitting power from one transmission member to the other, and resilient means adapted to hold the means for transmitting power from one transmission member to the other under tension to prevent slacking therein.

10. In a device of the character described, a support, a power transmission member slidable on the support, a second support, a power transmission member on the second support, power transmission means connecting the two power transmission members, means by which the distance between the two power transmission members may be changed, and resilient means urging one of the two power transmission members away from the other.

NOAH LOUIS DAUPLAISE.